(12) United States Patent
Miyasaka (10) Patent No.: US 11,378,081 B2
(45) Date of Patent: Jul. 5, 2022

(54) ELECTRIC PUMP

(71) Applicant: SHINANO KENSHI CO., LTD., Ueda (JP)

(72) Inventor: Takeshi Miyasaka, Nagano (JP)

(73) Assignee: SHINANO KENSHI CO., LTD., Ueda (JP)

( * ) Notice: Subject to any disclaimer, the term of this patent is extended or adjusted under 35 U.S.C. 154(b) by 61 days.

(21) Appl. No.: 16/386,325

(22) Filed: Apr. 17, 2019

(65) Prior Publication Data

US 2019/0345944 A1     Nov. 14, 2019

(30) Foreign Application Priority Data

May 11, 2018    (JP) .............................. JP2018-091999

(51) Int. Cl.
     *F04D 13/06*      (2006.01)
     *F04D 29/00*      (2006.01)
     (Continued)

(52) U.S. Cl.
     CPC ......... *F04D 13/0626* (2013.01); *F04D 13/06* (2013.01); *F04D 13/0693* (2013.01);
     (Continued)

(58) Field of Classification Search
     CPC .. F04D 13/06; F04D 13/0693; F04D 13/0626; F04D 29/007; F04D 13/0653;
     (Continued)

(56) References Cited

U.S. PATENT DOCUMENTS

| | | | | |
|---|---|---|---|---|
| 6,177,741 B1 * | 1/2001 | Lutkenhaus | ............. | H02K 3/47 310/71 |
| 6,229,240 B1 * | 5/2001 | Kech | ........................ | H02K 3/47 242/433 |

(Continued)

FOREIGN PATENT DOCUMENTS

| | | |
|---|---|---|
| JP | 3800371 B2 | 7/2006 |
| JP | 2010-043540 A | 2/2010 |

(Continued)

OTHER PUBLICATIONS

Feb. 12, 2019 Office Action issued in Japanese Patent Applicaiton No. 2018-091999.

(Continued)

*Primary Examiner* — Alexander B Comley
(74) *Attorney, Agent, or Firm* — Oliff PLC (57) ABSTRACT

An electric pump includes: an impeller; a rotor connected to the impeller; a housing accommodating the rotor; divided iron cores surrounding the housing from an outside of the housing; divided coil bobbins respectively attached to the divided iron cores; divided coils respectively wound around the divided coil bobbins; and a bus bar unit including bus bars, wherein the housing includes a bottom wall portion directly or indirectly holding a shaft portion in a standing manner, the shaft portion supports the rotor for rotation, the bottom wall portion overlaps at least a part of the divided coils in an orthogonal direction orthogonal to an axial direction of the rotor, and the bus bar unit is conductively connected to the divided coils and is held by the bottom wall portion.

6 Claims, 5 Drawing Sheets

(51) Int. Cl.
*H02K 3/04* (2006.01)
*H02K 5/04* (2006.01)

(52) U.S. Cl.
CPC .............. *F04D 29/007* (2013.01); *H02K 3/04* (2013.01); *H02K 5/04* (2013.01)

(58) Field of Classification Search
CPC .......... F04D 13/0606–064; H02K 3/04; H02K 3/28; H02K 3/50; H02K 3/52; H02K 3/521–522; H02K 5/12; H02K 5/128; H02K 5/132; H02K 5/22; H02K 5/04
USPC ............................................. 417/423.1–424.2
See application file for complete search history.

(56) References Cited

U.S. PATENT DOCUMENTS 6,365,998 B1 * 4/2002 Kech .................. H02K 3/47
310/194

| | | | |
|---|---|---|---|
| 2014/0091655 A1 * | 4/2014 | Kajita | .................. H02K 5/225 |
| | | | 310/71 |
| 2016/0079822 A1 | 3/2016 | Noguchi | |
| 2016/0118853 A1 | 4/2016 | Nishikawa | |
| 2018/0083516 A1 * | 3/2018 | Endo | .................. H02K 15/0043 |

FOREIGN PATENT DOCUMENTS

| | | | |
|---|---|---|---|
| JP | 2010043540 | * | 2/2010 |
| JP | 2013-207824 A | | 10/2013 |
| JP | 2016-059208 A | | 4/2016 |
| JP | 5912738 B2 | | 4/2016 |
| JP | 2017-184331 A | | 10/2017 |
| WO | 2013/102961 A1 | | 7/2013 |

OTHER PUBLICATIONS

Oct. 4, 2019 Search Report issued in European Patent Application No. 19171377.5.

* cited by examiner

ELECTRIC PUMP

CROSS-REFERENCE TO RELATED APPLICATION

This application is based upon and claims the benefit of priority of the prior Japanese Patent Application No. 2018-091999, filed on May 11, 2018, the entire contents of which are incorporated herein by reference.

BACKGROUND

(i) Technical Field

The present disclosure relates to an electric pump.

(ii) Related Art

Japanese Unexamined Patent Application Publication No. 2013-207824 describes an electric pump including divided iron cores, divided coil bobbins respectively attached to the divided iron cores, and divided coils respectively wound around the divided coil bobbins.

SUMMARY

According to an aspect of the present disclosure, there is provided an electric pump including: an impeller; a rotor connected to the impeller; a housing accommodating the rotor; divided iron cores surrounding the housing from an outside of the housing; divided coil bobbins respectively attached to the divided iron cores; divided coils respectively wound around the divided coil bobbins; and a bus bar unit including bus bars, wherein the housing includes a bottom wall portion directly or indirectly holding a shaft portion in a standing manner, the shaft portion supports the rotor for rotation, the bottom wall portion overlaps at least a part of the divided coils in an orthogonal direction orthogonal to an axial direction of the rotor, and the bus bar unit is conductive y connected to the divided coils and is held by the bottom wall portion.

DETAILED DESCRIPTION

Figure 1A:
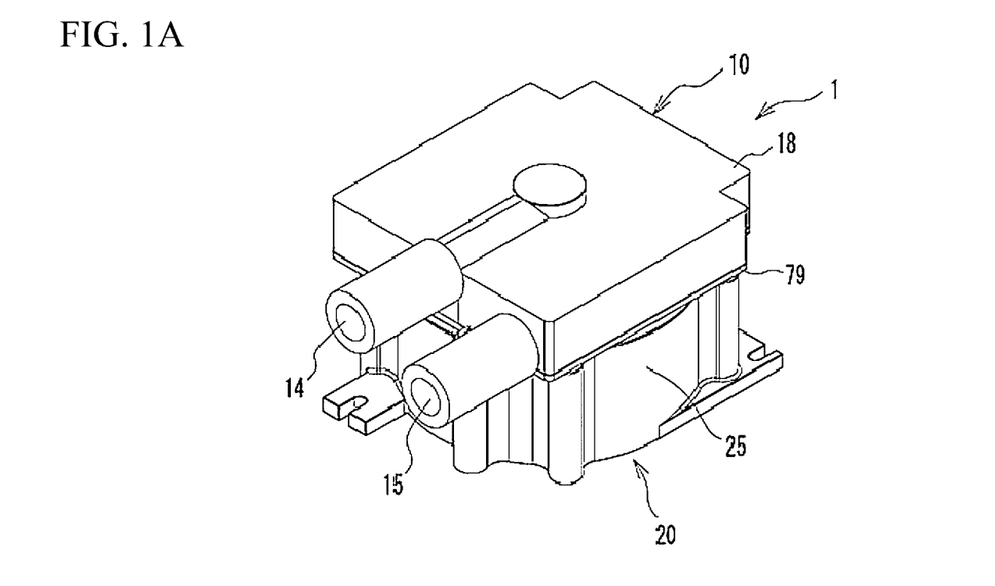
FIG. 1A is a perspective view of an electric pump.
Figure 1B:
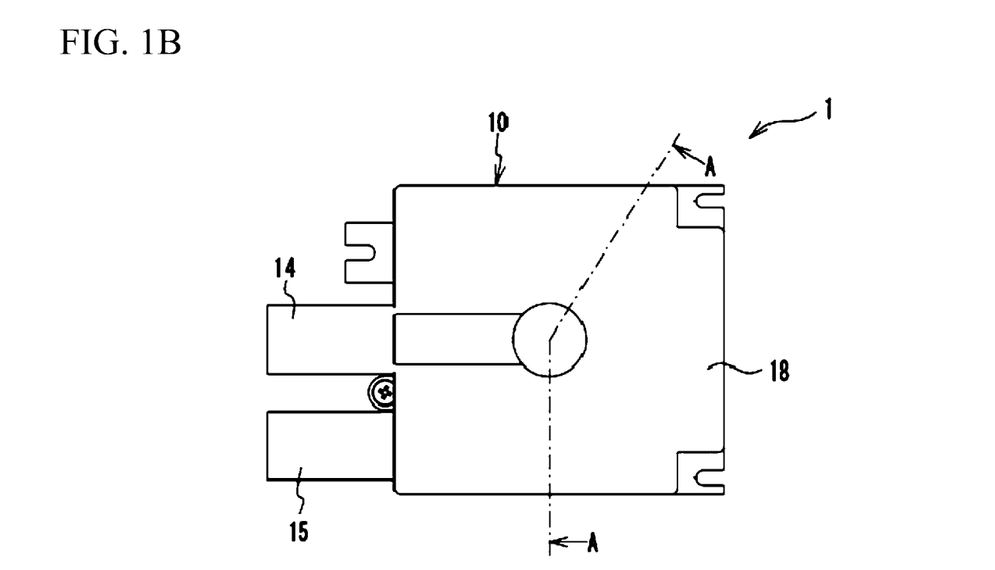
FIG. 1B is a top view of the electric pump.
Figure 2:
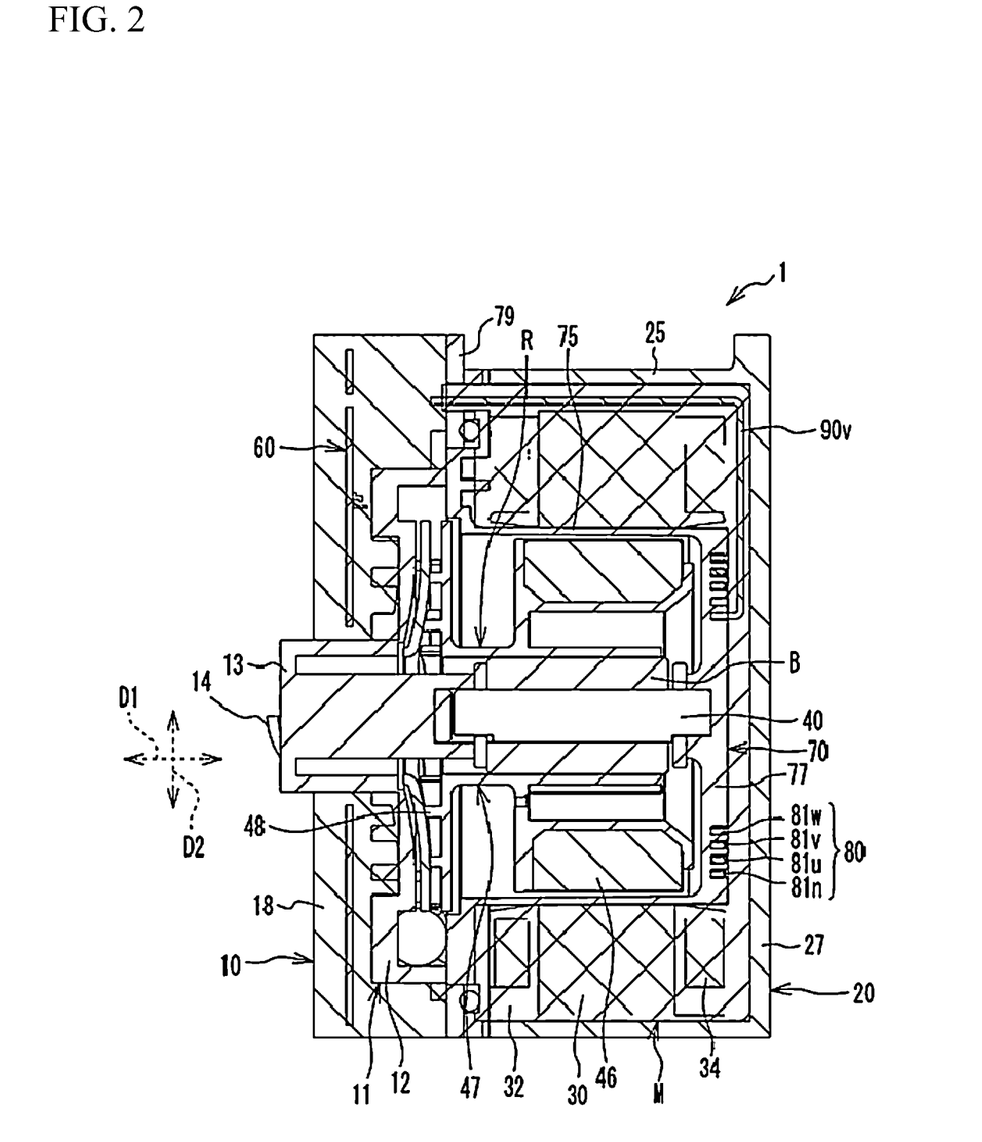
FIG. 2 is a cross-sectional view taken along line A-A of FIG. 1B.

FIG. 1A is a perspective view of an electric pump 1. FIG. 1B is a top view of the electric pump 1. FIG. 2 is a cross-sectional view taken along line A-A of FIG. 1B. The electric pump 1 includes cases 10 and 20. The case 10 includes a main body portion 11 and a resin portion 18. The main body portion 11 includes an impeller housing portion 12 accommodating an impeller portion 48, a shaft support portion 13 supporting a shaft member 40, an introduction pipe portion 14 introducing a fluid which is a liquid into the impeller housing portion 12, and a discharge pipe portion 15 discharging the fluid from the impeller housing portion 12. The introduction pipe portion 14 and the discharge pipe portion 15, substantially parallel to each other, extend in a direction perpendicular to an axial direction D1 in which the shaft member 40 extends. The resin portion 18 is formed into a substantially rectangular outer shape, covers the outside of the impeller housing portion. 12 of the main body portion 11, and surrounds the shaft support portion 13. In the resin portion 18, a printed circuit board 60 described later is embedded. The main body portion 11 may be made of metal such as aluminum or brass, or of synthetic resin having good thermal conductivity.

The case 20 accommodates a motor M. The motor N includes a rotor R, a housing 70 accommodating the rotor R, divided iron cores 30, divided coil bobbins 32 respectively attached to the divided iron cores 30, and divided coils 34 respectively wound around the divided coil bobbins 32. The rotor R is an example of a rotor. The divided iron cores 30, the divided coil bobbins 32, and the divided coils 34 will be described later in detail. The rotor R includes a bearing B fitted around the shaft member 40 described above, a holding member 47 fitted onto the bearing B and rotating together therewith, and permanent magnets 46 held on the outer peripheral side of the holding member 47 and facing an inner circumferential surface of a cylindrical portion 75 of the housing 70. An end side of the holding member 47 is provided with the impeller portion 48 introducing a fluid from the introduction pipe portion 14 and discharging the fluid from the discharge pipe portion 15.

The housing 70 is accommodated in the case 20, and includes the cylindrical portion 75, a bottom wall portion 77, and a flange portion 79. The cylindrical portion 75 has a cylindrical shape and faces the permanent magnets 46. The bottom wall portion 77 holds the shaft member 40 in a posture perpendicular to the bottom wall portion 77, that is, in a standing manner where the shaft member 40 stands thereon. The cylindrical portion 75 extends radially outward from an end of the cylindrical portion 75 opposite to the bottom wall portion 77, The housing 70 accommodates at least a part of the rotor R. The housing 70 is made of synthetic resin, but is not limited to this, and may be made of, for example, nonmagnetic metal. A bus bar unit 80 is disposed on the bottom wall portion 77 of the housing 70. The bus bar unit 80 is conductively connected to the divided coils 34, Details of the bus bar unit 80 will be described later. Further, the bus bar unit 80 is conductively connected to the printed circuit board 60 via conductive pins 90$u$, 90$v$, and 90$w$ described later. The conductive pins 90$u$, 90$v$, and 90$w$ extend into between the motor M and a peripheral wall 25 of the case 20 from between the bottom wall portion 77 of the housing 70 and a bottom wall portion 27 of the case 20. Additionally, a resin is filled and hardened inside the case 20 outside the housing 70. The divided iron cores 30, the divided coil bobbins 32, and the divided coils 34 are embedded in this resin.

Figure 3:
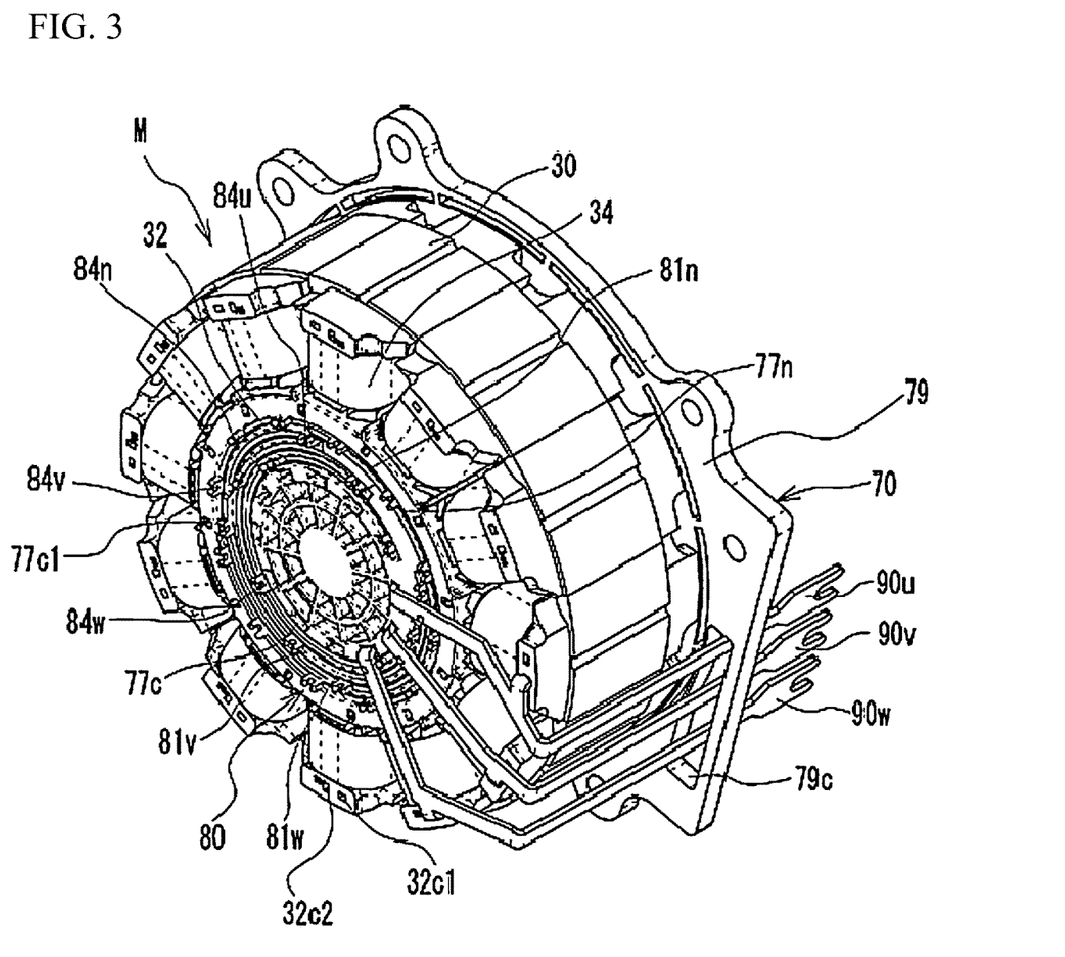
FIG. 3 is an explanatory view of a bus bar unit.
Figure 4:
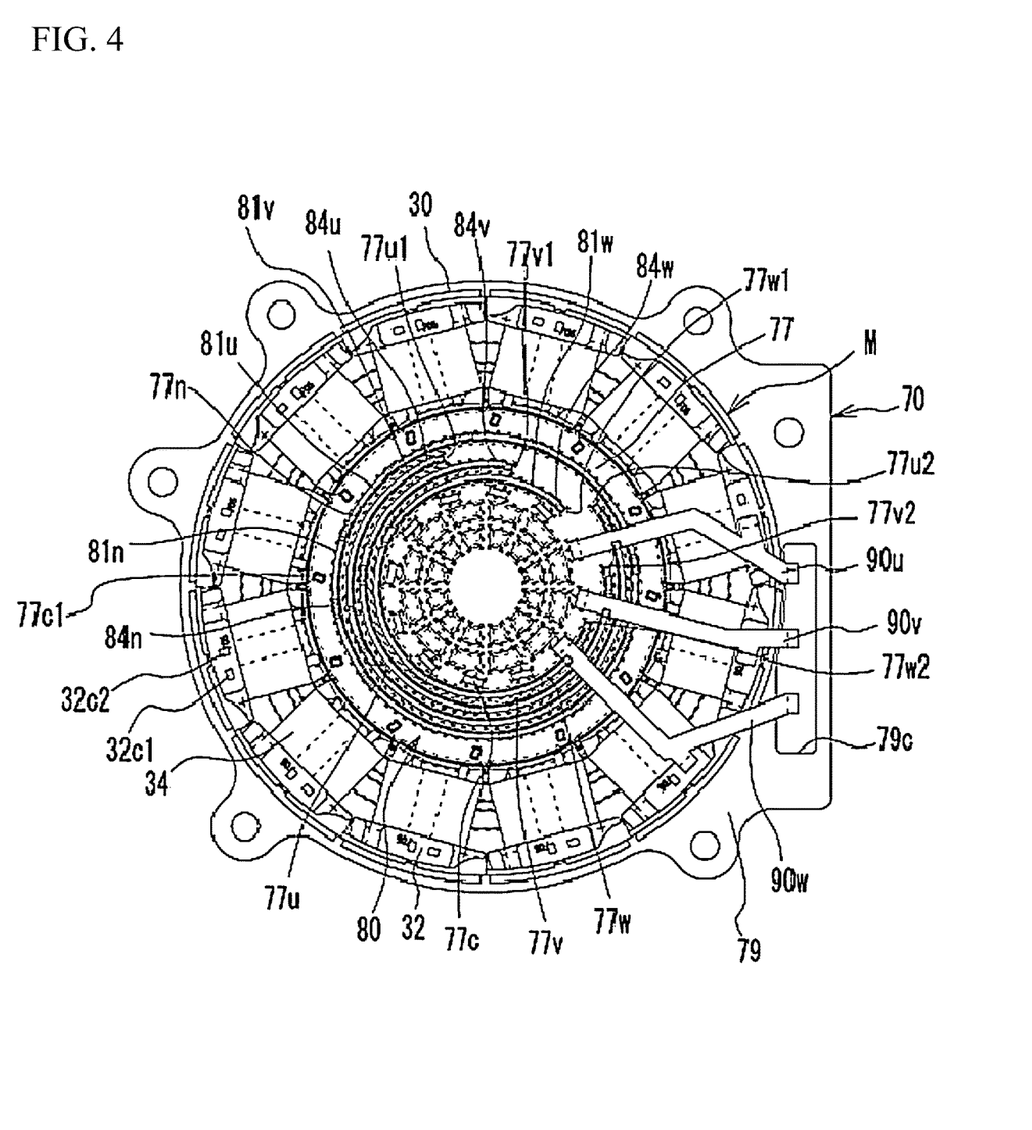
FIG. 4 is an explanatory view of the bus bar unit.

FIGS. 3 and 4 are explanatory views of the bus bar unit 80. The divided iron cores 30 are arranged circumferentially, and surround the cylindrical portion 75 of the housing 70 from the outside. The bus bar unit 80 includes bus bars 81$n$, 81$u$, 81$v$, and 81$w$ each formed into a substantially ring shape. The bus bars. 81$n$, 81$u$, 81$v$, and 81$w$ are arranged substantially concentrically on substantially the same plane. The bus bars 81$n$, 81$u$, 81$v$, and 81$w$ are formed by, for example, pressing, punching, and bending a flat metal plate made of copper. The bus bar 81$n$, which is a common line, is disposed on the radially most outer side. The bus bar 81$w$ is disposed on the radially most inner side. Further, the bus bar 81$u$ is disposed radially outward from the bus bar 81$v$. Terminal portions 84$n$, 84$u$, 84$v$, and 84$w$ respectively protrude outward from the bus bars 81$n$, 81$u$, 81$v$, and 81$w$, in the axial direction. The terminal portions 84*u*, 84*v*, and 84*w* are conductively connected to ends of the divided coils 34 of U phase, V phase, and W phase, respectively. The terminal portion 84*n* is conductively connected to the other ends of the divided coils 34 of each phase. Therefore, the bus bar 81*n* is connected via the terminal portion 84*n* to the divided coils 34, the number of which is larger than the number of the bus bars 81*u*, 81*v*, and 81*w*. For this reason, the bus bar 81*n* is arranged on the radially most outer side, in order to improve the manufacturability and to reduce the possibility of contact with other bus bars.

Further, since the bus bar 81*n* is connected to a large amount of the divided coils 34, the bus bar 81*n* is longer than each of the bus bars 81*u*, 81*v*, and 81*w* in the circumferential direction. Specifically, the bus bar 81*n* has a substantially circular ring shape with both ends, Each of the bus bars 81*u*, 81*v*, and 81*w* has a ring shape with both ends, in other words, an arc shape. That is, the both ends of each of the bus bars 81*u*, 81*v*, and 81*w* face each other in the circumferential direction. The positions, lengths, and shapes of the bus bars 81*n*, 81*u*, 81*v*, and 81*w* are not limited to these. The bus bar may have, for example, a polygonal shape such as a quadrangle, a hexagon, or an octagon, Only a part of the bus bar may be curved in the axial direction D1 or an orthogonal direction D2.

Figure 5:
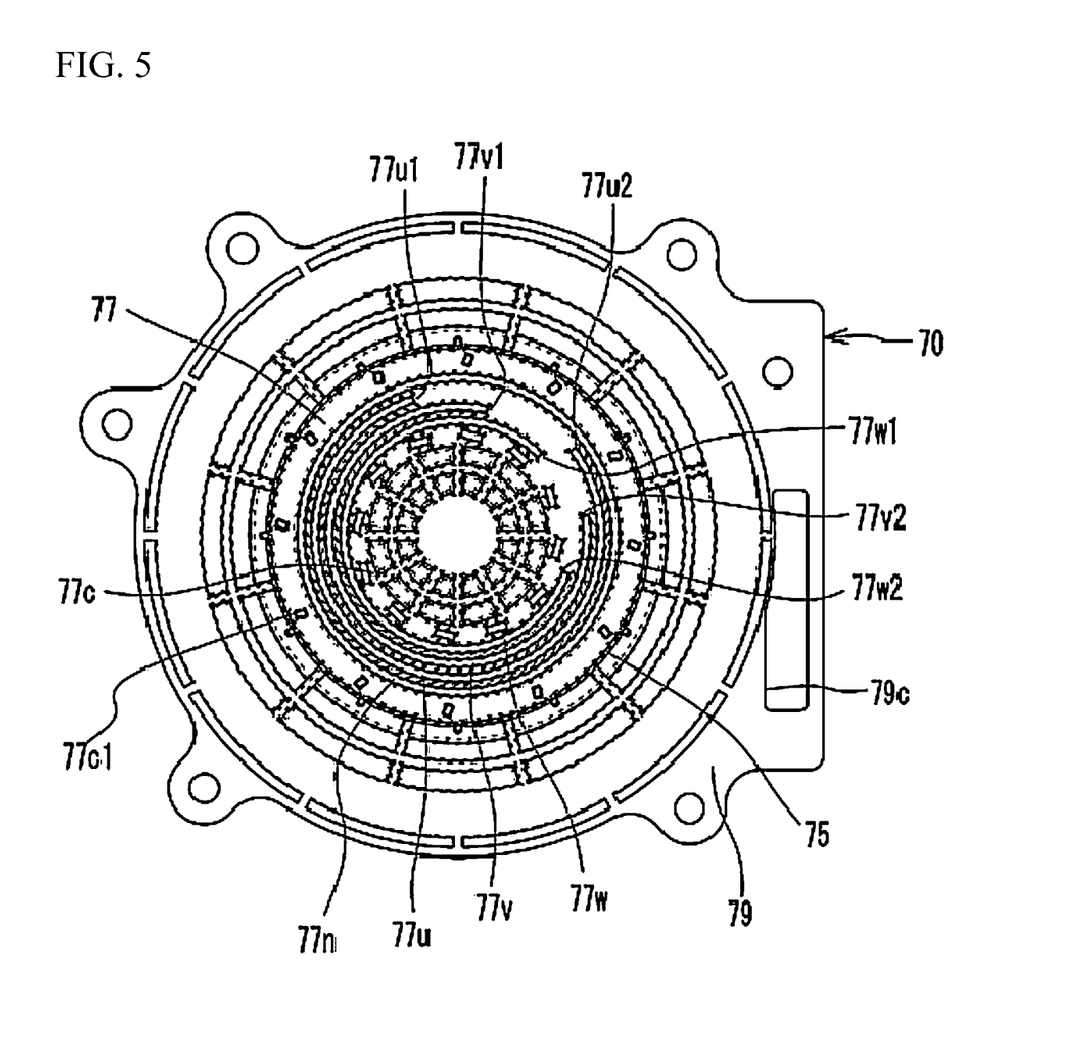
FIG. 5 is an explanatory view of a housing.

FIG. 5 is an explanatory view of the housing 70. FIG. 5 illustrates the housing 70 to which the divided iron cores 30, the divided coil bobbins 32, the divided coils 34, and the bus bar unit 80 are not attached. As illustrated in FIGS. 2, 4 and 5, the bottom wall portion 77 of the housing 70 is formed with groove portions 77*n*, 77*u*, 77*v*, and 77*w* respectively accommodating the bus bars 81*n*, 81*u*, 81*v*, and 81*w*. The groove portions 77*n*, 77*u*, 77*v*, and 77*w* correspond to the lengths and the shapes of the bus bars 81*n*, 81*u*, 81*v*, and 81*w*, respectively. Accordingly, the groove portion 77*n* has a ring shape, and each of the groove portion, 77*u*, 77*v*, and 77*w* has a ring shape with both ends. Additionally, in FIG. 3, these groove portions are not given reference numerals. Further, the shape of the groove portion is not limited to this, as long as the groove portion accommodates a bus bar.

As illustrated in FIG. 2, the groove portions 77*n*, 77*u*, 77*v*, and 77*w* are spaced apart from one another in the orthogonal direction D2 orthogonal to the axial direction D1. That is, the bus bars 81*n*, 81*u*, 81*v*, and 81*w* are separated from one another by the groove portions 77*n*, 77*u*, 77*v*, and 77*w*. This suppresses the contact between the adjacent bus bars. This also suppresses the positional displacement of the bus bars in the radial direction. Further, in the state where the bus bars are accommodated in these groove portions, the bus bars do not interfere with assembling work. This suppresses the deterioration of assembling workability of the other components to the housing 70. Thus, the groove portions 77*n*, 77*u*, 77*v*, and 77*w* correspond to separating portions that separate the adjacent bus bars from each other.

Further, as illustrated in FIGS. 4 and 5, the groove portion 77*u* includes end portions 77*u*1 and 77*u*2. Therefore, the end portions 77*u*1 and 77*u*2 regulate the positional displacement of the bus bar 81*u* in the circumferential direction. Likewise, end portions 77*v*1 and 77*v*2 of the groove portion 77*v* regulate the positional displacement of the bus bar 81*v* in the circumferential direction. End portions 77*w*1 and 77*w*2 of the groove portion 77*w* also regulate the positional displacement of the bus bar 81*w* in the circumferential direction. The positional displacement of the bus bars 81*u*, 81*v*, and 81*w* in the circumferential direction is regulated in such a manner. This prevents disconnection of the divided coils connected to the bus bars due to the positional displacement of the bus bars in the circumferential direction. Furthermore, the bus bars 81*u*, 81*v*, and 81*w* are stably held by the housing 70 at the time of assembling work, whereby the deterioration of the workability is suppressed. Thus, the groove portions 77*u*, 77*v*, and 77*w* correspond to regulating portions that respectively regulate the positional displacement of the bus bars 81*u*, 81*v*, and 81*w* in the circumferential direction.

Further, as illustrated in FIG. 5, the bottom wall portion 77 of the housing 70 is provided with engagement holes 77*c* positioned radially inward from the groove portion 77*w*. The engagement holes 77*c* are provided at predetermined angular intervals in the circumferential direction. As illustrated in FIGS. 3 and 4, the ends of the conductive pins 90*u*, 90*v*, and 90*w* are respectively inserted into the engagement holes 77*c*. Thus, the bottom wall portion 77 of the housing 70 holds the conductive pins 90*u*, 90*v*, and 90*w* in a stable manner. Further, the number of the engagement holes 77*c* is larger than the number of the conductive pins 90*u*, 90*v*, and 90*w* used. It is therefore possible to facilitate changing the positions of the conductive pins 90*u*, 90*v*, and 90*w* illustrated in FIGS. 3 and 4. Therefore, the housing 70 is adoptable to a different type of an electric pump different from the electric pump 1 described as the present embodiment. This improves the versatility.

Further, as illustrated in FIGS. 3 and 4, the divided coil bobbin 32 is provided with two different engagement holes 32*c*1 and 32*c*2 that have different shapes and positioned radially outside the divided coil 34. Each of the conductive pins 90*u*, 90*v*, and 90*w* is partially inserted into one of the engagement holes 32*c*1 and 32*c*2. Thus, the conductive pins 90*u*, 90*v*, and 90*w* are held in a stable manner by the divided coil bobbins 32. Further, since the engagement holes 32*c*1 and 32*c*2 are provided in all the divided coil bobbins 32, even if the conductive pins 90*u*, 90*v*, and 90*w* illustrated in FIGS. 3 and 4 positionally change, the conductive pins 90*u*, 90*v*, and 90*w* are held in a stable manner by the engagement holes 32*c*1 or 32*c*2 of the other divided coil bobbins 32, The reason why two different engagement holes 32*c*1 and 32*c*2 are provided in one divided coil bobbin 32 is that the conductive pin is capable of being partially inserted into the optimum engagement hole according to the position and the shape of the conductive pin.

Further, as illustrated in FIG. 5, the bottom wall portion 77 of the housing 70 is provided with engagement holes 77*c*1 on the radially outer side from the groove portion 77*u*. The engagement holes 77*c*1 are provided at predetermined angular intervals in the circumferential direction. That is, the engagement holes 77*c*1 and the above-mentioned engagement holes 77*c* are formed on the opposite sides through the groove portions 77*n*, 77*u*, 77*v*, and 77*w*. In the present embodiment, each of the conductive pins 90*u*, 90*v*, and 90*w* are partially inserted into the engagement hole 32*c*1 or 32*c*2 of the divided coil bobbin 32, but may be partially inserted into the engagement hole 77*c*1. The conductive pins are capable of being partially inserted into the engagement holes 77*c* and 77*c*1 in light of the size and the use of the electric pump and the size and the shape of the conductive pin, thereby holding the conductive pins in a stable manner. Thus, the housing 70 is capable of being employed for a wide variety of electric pumps, and its versatility is improved. In the present embodiment, the engagement holes 77*c* and 77*c*1 are different in shape from each other. However, the present disclosure is not limited to this, and the same shape may be employed.

Further, as illustrated in FIG. 2, each of the bus bars 81*n*, 81*u*, 81*v*, and 81*w* is formed such that a width in the orthogonal direction D2 orthogonal to the axial direction D1 narrower than a height in the axial direction D1. Therefore, the bus bars 81n, 81u, 81v, and 81w are capable of being disposed on the bottom wall portion 77 of the housing 70, which is a narrow area in the orthogonal direction D2. Furthermore, each height of the bus bars 81n, 81u, 81v, and 81w is ensured, and each volume thereof is ensured. Thus, the bus bars 81n, 81u, 81v, and 81w are suitable for supplying large electricity to the divided coils 34.

The conductive pins 90u, 90v, and 90w are respectively conductively connected to the bus bars 81u, 81v, and 81w. Additionally, the flange portion 79 of the housing 70 is provided with relief holes 79c through which the conductive pins 90u, 90v, and 90w are inserted.

Herein, as illustrated in FIG. 2, the bottom wall portion 77 of the housing 70 overlaps the divided coils 34 in the orthogonal direction D2, and the bus bars 81n, 81u, 81v, and 81w of the bus bar unit 80 also overlap the divided coils 34 in the orthogonal direction D2. This suppresses the protrusion amounts, in the axial direction D1 from the divided coil 34, of the bottom wall portion 77 of the housing 70 and the bus-bar unit 80. It is thus possible to suppress an increase in size of the electric pump 1 in the present embodiment in the axial direction D1.

In addition, the bus bar unit 80 is held by the opposite surface of the bottom wall portion 77 of the housing 70 opposite to the surface on which the shaft member 40 is supported. This eliminates the need for another component for holding the bus bar unit 80. Thus, functions are integrated in the housing 70, thereby suppressing an increase in the number of parts and suppressing an increase in the manufacturing cost.

Further, the divided coils 34 are conductively connected to the above-described terminal portion 84n, 84u, 84v, and 84w, the terminal components are not integrally provided in the divided coil bobbins 32, and the terminal portions 84n, 84u, 84v, and 84w are respectively and integrally provided in the bus bars 81n, 81u, 81v, and 81w. This also suppresses an increase in the number of parts and suppresses an increase in the manufacturing cost.

The inside of the housing 70 is communicated with the inside of the impeller housing portion 12, and the fluid is also introduced into the housing 70 by the rotation of the impeller portion 48. This promotes the heat radiation of the housing 70, thereby suppressing an increase in temperature of the bus bar unit 80 held by the bottom wall portion 77 of the housing 70.

As described above, the printed circuit board 60 faces the impeller housing portion 12 of the main body portion 11, and overlaps the introduction pipe portion 14 in the orthogonal direction D2 as can be estimated from FIG. 1A. This suppresses the printed circuit board 60 from protruding outside the introduction pipe portion 14 in the axial direction D1, and suppresses an increase in size of the electric pump 1 in the axial direction D1 in the present embodiment.

While the exemplary embodiments of the present disclosure have been illustrated in detail, the present disclosure is not limited to the above-mentioned embodiments, and other embodiments, variations and modifications may be made without departing from the scope of the present disclosure.

Although the above-mentioned electric pump 1 introduces and discharges the liquid, the present disclosure may be applied to an electric pump which introduces and discharges a gas as a fluid.

In the above embodiment, the bottom wall portion 77 overlaps all the divided coils 34 in the orthogonal direction D2. However, the present disclosure is not limited to this. At least a part of the bottom wall portion 77 has only to overlap the divided coil 34 in the orthogonal direction D2.

In the above embodiment, one end of the shaft member 40 is fixed to the bottom wall portion 77, and the shaft member 40 is directly supported thereby, but the present disclosure is not limited to this. For example, the shaft member may be indirectly supported through a predetermined member by the bottom wall portion.

Although the bottom wall portion 77 is separated from the shaft member 40 in the above embodiment, the present disclosure is not limited to this. For example, the shaft member may be integrally formed in the bottom wall portion.

Although the bottom wall portion 77 of the housing 70 supports the shaft member 40 in a non-rotatable manner in the above embodiment, the present disclosure is not limited to this. For example, the bottom wall may support the shaft member for rotation. For example, a bearing may be fixed to the bottom wall of the housing, and the shaft member may be rotatably supported by the bearing, and a permanent magnet may be fixed directly or indirectly to the shaft member. In this case, the shaft member rotates together with the rotor.

What is claimed is:

1. An electric pump comprising: an impeller; a rotor connected to the impeller; a housing accommodating the rotor; divided iron cores surrounding the housing at an exterior of the housing; divided coil bobbins respectively attached to the divided iron cores; divided coils respectively wound around the divided coil bobbins: and a bus bar unit including bus bars, wherein the bus bar unit is surrounded by the divided coil bobbins and the divided coils, the housing includes: a bottom wall portion directly or indirectly holding a shaft portion in a standing manner: and a cylindrical portion integrally formed with the bottom wall portion, the shaft portion supports the rotor for rotation, the bottom wall portion overlaps at least a part of the divided coils in an orthogonal direction that is orthogonal to an axial direction of the rotor, the bus bars overlap the divided coil bobbins and the divided coils in the orthogonal direction and overlap the rotor in the axial direction, the bus bar unit is conductively connected to the divided coils, and is held by the bottom wall portion, the bus bars are arranged on a same plane with each other, and include a first bus bar and a second bus bar, the first bus bar and the second bus bar are each formed in an arc shape, and both ends of the first bus bar are positioned away from both ends of the second bus bar in a circumferential direction, and a length of the first bus bar differs from a length of the second bus bar in the circumferential direction.

2. The electric pump according to claim 1, wherein rotation of the impeller causes a fluid to flow between the bottom wall portion of the housing and the rotor.

3. The electric pump according to claim 1, wherein the bottom wall portion includes a separating portion that separates the bus bars from each other in the orthogonal direction.

4. The electric pump according to claim 1, wherein the bottom wall portion includes a regulating portion that regulates positional displacement of the bus bars in the circumferential direction.

5. The electric pump according to claim 1, wherein
the bottom wall portion includes a groove portion accommodating the bus bars,
the groove portion includes:
a separating portion that separates the bus bars from each other in the orthogonal direction; and a regulating portion that regulates a positional displacement of the bus bars in a circumferential direction.

6. The electric pump according to claim 1, wherein the bus bars are arranged substantially concentrically on the same plane with each other.

* * * * *